Sept. 5, 1961 W. E. THILL 2,998,644
SEAL DRIVER ASSEMBLY
Filed June 16, 1958

INVENTOR.
Walter E. Thill
BY
Harness, Dickey & Pierce
ATTORNEYS.

United States Patent Office 2,998,644
Patented Sept. 5, 1961

2,998,644
SEAL DRIVER ASSEMBLY
Walter E. Thill, Grosse Pointe Woods, Mich., assignor to Federal-Mogul-Bower Bearings, Inc., a corporation of Michigan
Filed June 16, 1958, Ser. No. 742,083
2 Claims. (Cl. 29—275)

This invention relates to apparatus for installing oil seals.

Seal driver assemblies are commonly used for installing seals. Each seal mounting operation involves striking the driver handle with a hammer or the like to force the seal into a housing or into its seat. Consequently, breakage of the driver parts is one of the major problems in prior assemblies.

The principal object of this invention, therefore, is to provide a durable seal driver consisting of a minimum of parts which is usable over a prolonged service life and which is readily adapted for installing seals of different sizes.

Further objects, features and advantages of this invention will become apparent from a consideration of the following description, the appended claims and the accompanying drawing in which:

Figure 1:
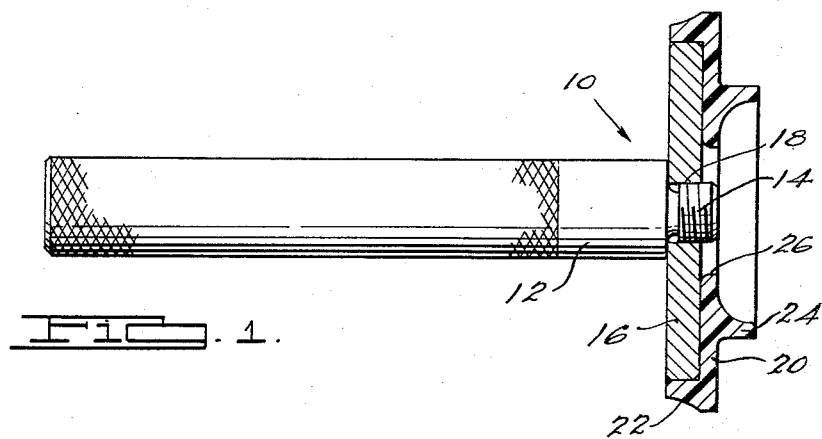
FIGURE 1 is an elevational view of the seal driver assembly of this invention illustrating a portion of the assembly in section for the purpose of clarity.
Figure 2:
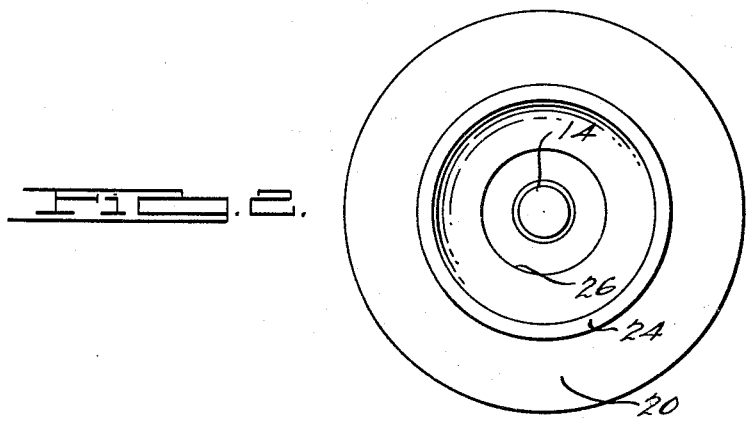
FIG. 2 is an end view of the assembly of this invention.

With reference to the drawing, the seal driver assembly of this invention, indicated generally at 10, is illustrated in FIG. 1 as consisting of an elongated cylindrical handle member 12 having a reduced diameter threaded extension 14. A circular driver plate 16 has a central internally threaded opening 18 into which the handle extension 14 is threaded in mounting the driver plate 16 on the handle 12. A molded plastic adapter member 20 for supporting a seal to be installed is mounted on the driver plate 16. The adapter member 20 is of a generally ring shape and has an annular flange portion 22 extending laterally in one direction of a size to fit snugly about the driver plate 16. The adapter member 20 has a second annular portion 24 which extends laterally in the opposite direction and is of a smaller diameter than the flange portion 22. By virtue of its ring shape, the adapter member 20 has a central opening 26 of a diameter greater than the diameter of the plate opening 18. Consequently, the adapter member 20 is spaced from the extension 14.

In order to mount the adapter member 20 on the plate 16, it is only necessary to frictionally force the plate 16 into the opening defined by the flange 22. The adapter member 20 is readily removed by grasping it and moving it axially off the plate 16.

While only a single adapter member 20 is illustrated in the drawing, it is to be understood that several adapter members 20 are normally used with a single driver plate 16, the adapter members differing only with respect to the diameter of the annular seal supporting portions 24 thereon so that different size seals can be installed.

Figure 3:
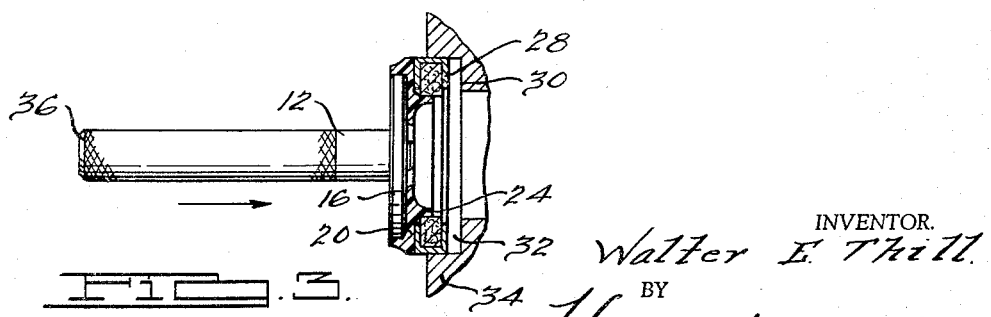
FIG. 3 is a view illustrating the manner in which the assembly is manipulated to install a seal.

The use of the assembly 10 to install a seal 28, for example a front automobile wheel oil seal, on a seat 30 is shown in FIG. 3. The seal 28 is supported on the flange 24 and the assembly 10 is manipulated so that the seal 28 is positioned in alignment with the cavity 32 in the wheel 34 in which it is to be installed. The operator then strikes the free end 36 of the handle 12 with a tool such as a hammer to force the seal 28 into the cavity 32 and onto the seat 30 at the inner end of the cavity. The portion 24 is of a slightly larger diameter than the seal 28 but the sealing member is soft so that the adapter 20 is readily withdrawn from the seal 28 after it is installed. When smaller seals 28 are to be installed, the adapter member 20 is replaced with another similar adapter member having a smaller diameter annular portion 24 of a size to support the smaller seal.

By virtue of the mounting of the adapter member 20 on the plate 16 so that it is out of contact with the handle 12 and its extension 14, the shock of the blow applied to the handle 12 is not transmitted directly as a concentrated force to the adapter member 20. Consequently, the seal driver assembly 10 of this invention is usable over a prolonged service life without danger of breakage.

Although the invention has been described with respect to a preferred embodiment thereof, it is to be understood that it is not to be so limited, since changes can be made therein which are within the scope of the invention as defined by the appended claims.

What is claimed is:

1. A seal driver assembly comprising a substantially circular driver plate, a handle member secured to said driver plate so that it extends substantially axially from one side thereof, a unitary adaptor member having substantially concentric annular portions one of which is a size to be frictionally supported on and extend about said driver plate and the other one of which extends axially from the opposite side of said driver plate when said first portion is supported thereon, said adaptor member having a substantially centrally disposed aperture being substantially coaxial with said handle member and being defined by a surface spaced radially outwardly from the periphery of said handle.

2. A seal driver assembly comprising a circular driver plate having a threaded opening extending axially thereof, a handle member having a threaded extension at one end threaded into said plate opening from one side of the plate and a molded plastic adapter member having a first annular portion frictionally supported on and extended about the plate and a second annular portion of a smaller diameter than said first portion extended away from the driver plate on the side thereof opposite said handle, said first portion having an opening extending axially thereof a diameter greater than the diameter of said threaded extension concentric with said threaded extension.

References Cited in the file of this patent
UNITED STATES PATENTS

| | | |
|---|---|---|
| 1,487,592 | Novotny | Mar. 18, 1924 |
| 1,530,866 | Wakefield | Mar. 24, 1925 |
| 2,230,406 | Johnson | Feb. 4, 1941 |
| 2,604,914 | Kahlen | July 29, 1952 |
| 2,633,599 | Dolan | Apr. 7, 1953 |
| 2,860,535 | Fowler | Nov. 18, 1958 |

UNITED STATES PATENT OFFICE
CERTIFICATION OF CORRECTION

Patent No. 2,998,644                       September 5, 1961

Walter E. Thill

It is hereby certified that error appears in the above numbered patent requiring correction and that the said Letters Patent should read as corrected below.

Column 1, line 14, for "into", second occurrence, read -- onto --; column 2, line 52, after "thereof" insert -- of --.

Signed and sealed this 17th day of April 1962.

(SEAL)
Attest:

ESTON G. JOHNSON
Attesting Officer

DAVID L. LADD
Commissioner of Patents